United States Patent
Kaburlasos et al.

(10) Patent No.: US 11,238,557 B2
(45) Date of Patent: Feb. 1, 2022

(54) WORKLOAD-BASED MAXIMUM CURRENT

(71) Applicant: Intel Corporation, Snta Clara, CA (US)

(72) Inventors: Nikos Kaburlasos, Folsom, CA (US);
Eric Samson, Folsom, CA (US);
Jaymin B. Jasoliya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 16/369,608

(22) Filed: Mar. 29, 2019

(65) Prior Publication Data
US 2020/0311860 A1 Oct. 1, 2020

(51) Int. Cl.
*G06F 9/30* (2018.01)
*G06T 1/20* (2006.01)
*G06F 1/3296* (2019.01)
*G06F 1/3228* (2019.01)
*G06F 1/3234* (2019.01)

(52) U.S. Cl.
CPC .............. *G06T 1/20* (2013.01); *G06F 1/3228* (2013.01); *G06F 1/3243* (2013.01); *G06F 1/3296* (2013.01); *G06F 9/30094* (2013.01)

(58) Field of Classification Search
CPC .................................. G06F 1/32; G06T 1/20
See application file for complete search history.

(56) References Cited

U.S. PATENT DOCUMENTS

| | | | | |
|---|---|---|---|---|
| 5,864,701 A * | 1/1999 | Col | ......................... | G06F 13/24 710/260 |
| 8,473,539 B1 * | 6/2013 | Rao | ......................... | G06F 17/16 708/522 |
| 9,336,055 B2 * | 5/2016 | Arao | .................... | G06F 11/3423 |
| 9,804,666 B2 * | 10/2017 | Jiao | ....................... | G06F 1/3296 |
| 2003/0135718 A1 * | 7/2003 | DeWitt, Jr. | ......... | G06F 11/3476 712/227 |
| 2004/0221278 A1 * | 11/2004 | Dankel | ................. | G06F 9/3836 717/139 |
| 2005/0283634 A1 * | 12/2005 | Rai | ........................ | G09G 5/395 713/600 |
| 2012/0210106 A1 * | 8/2012 | Shen | ..................... | G06F 9/3867 712/233 |
| 2012/0254439 A1 * | 10/2012 | Yamasaki | ............ | G06F 3/1438 709/226 |

(Continued)

FOREIGN PATENT DOCUMENTS

KR  101655027  9/2016
KR  1020180064934  6/2018

OTHER PUBLICATIONS

International Search Report & Written Opinion notified Jun. 4, 2020 for PCT Patent Application No. PCT/US2020/017279.

*Primary Examiner* — Phil K Nguyen
(74) *Attorney, Agent, or Firm* — Schwabe, Williamson & Wyatt, P.C.

(57) ABSTRACT

Described is an apparatus comprising a first circuitry and a second circuitry. The first circuitry may process a sequence of Graphics Processing Unit (GPU) commands including an instruction carrying a flag that indicates a workload characteristic corresponding with the sequence of GPU commands. The second circuitry may initiate a power-directed parameter adjustment based upon the flag.

17 Claims, 6 Drawing Sheets

(56) References Cited

U.S. PATENT DOCUMENTS

| | | | |
|---|---|---|---|
| 2013/0155081 A1* | 6/2013 | Khodorkovsky | G06F 1/3287 |
| | | | 345/522 |
| 2015/0185803 A1* | 7/2015 | Salsbery | G06F 1/324 |
| | | | 713/322 |
| 2015/0355705 A1* | 12/2015 | Weissmann | G06F 1/3287 |
| | | | 713/322 |
| 2018/0157465 A1* | 6/2018 | Bittner | G06N 3/063 |
| 2018/0239606 A1* | 8/2018 | Mantor | G06F 9/3836 |
| 2018/0307980 A1 | 10/2018 | Barik et al. | |
| 2018/0373562 A1 | 12/2018 | Roberts et al. | |
| 2019/0057484 A1* | 2/2019 | Iwamoto | G06T 1/20 |
| 2019/0066256 A1 | 2/2019 | Sharma et al. | |
| 2019/0278605 A1* | 9/2019 | Emberling | G06F 9/46 |
| 2020/0250521 A1* | 8/2020 | Ishizu | G06F 7/5443 |

* cited by examiner

WORKLOAD-BASED MAXIMUM CURRENT

BACKGROUND

In computing systems, maximum current draw (Iccmax) for a particular component, such as for a Graphics Processing Unit (GPU), may have an impact on a Voltage Identification (VID) setting, and therefore may have an impact on power dissipation. Iccmax may also affect a maximum operating frequency (Fmax), which may depend upon a certain Iccmax limit.

Iccmax may be determined by a GPU configuration (e.g., whether some parts of the GPU are idle and/or power gated) and/or by an operating frequency (e.g., with higher frequencies corresponding with higher Iccmax). However, Iccmax may actually also depend on characteristics of a workload executed on the GPU.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
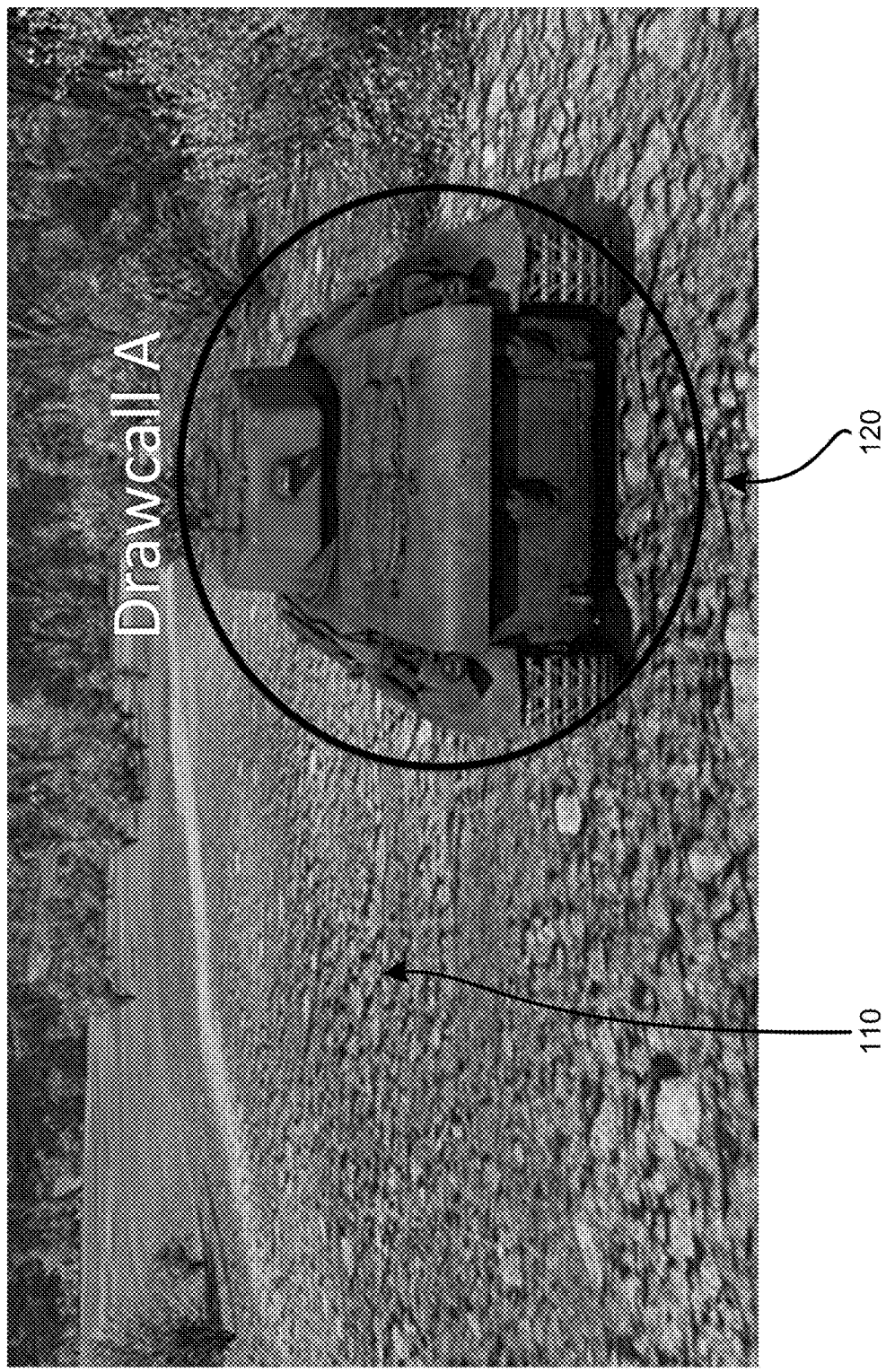
FIG. 1 illustrates an exemplary video frame with regions resulting from different types of graphical processing, in accordance with some embodiments of the disclosure.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In computing systems, maximum current draw (Iccmax) for a particular component or portion of a design (e.g., an Intellectual Property block (IP) incorporated into a design), such as for a Central Processing Unit (CPU) or a Graphics Processing Unit (GPU), may have an impact on a Voltage Identification (VID) setting, and therefore may have an impact on power dissipation. Iccmax may also affect a maximum operating frequency (Fmax), which may depend upon a certain Iccmax limit. Removing unnecessary Iccmax guardband out of an Iccmax value may facilitate minimization of power dissipation and may facilitate implementing a maximum possible Fmax for a GPU.

Today, Iccmax may be determined by a GPU configuration (e.g., whether some parts of the GPU are idle and/or power gated) and/or by an operating frequency (e.g., with higher frequencies corresponding with higher Iccmax). However, Iccmax may actually also depend on characteristics of a workload executed on the GPU. Neglecting workload information in setting Iccmax values for a GPU may leave excessive Iccmax guardband in place, which may in turn impact voltage settings (and thereby power dissipation) and may also impact GPU's Fmax within a given Iccmax budget.

For example, Iccmax may be determined by a GPU configuration (e.g., how many slices or Execution Units (EUs) are powered up) and/or by operating frequency. Higher Iccmax may then correspond with higher frequencies. Iccmax may be used by "pcode" (e.g., firmware running on the GPU or an Embedded Processor Unit) to determine VID setting which may avoid timing violations, with higher Iccmax corresponding with higher VID settings, and may thereby significantly affect power dissipation.

By removing unnecessary Iccmax guardband, the mechanisms and methods disclosed herein may advantageously facilitate lowering of an operating voltage, and may thereby reduce a component's power dissipation, and/or may increase performance within a certain power budget. The mechanisms and methods disclosed herein may also facilitate achieving higher Fmax and/or performance within a certain Iccmax budget.

Iccmax may be used by pcode to determine VID setting which may avoid timing violations, with higher Iccmax corresponding with higher VID settings. However, since higher voltages may correspond with higher power dissipation, Iccmax may be closely related to power consumption of a component or an IP. In addition, platform power delivery systems may impose an Iccmax limit which should not be exceeded (at least, not with additional money spent on the power delivery system). Fmax for a component or an IP—for example, a GPU—may accordingly be set such that an Iccmax limit not be exceeded.

However, Iccmax for the component may also depend on additional factors beyond configuration and frequency, such as the type of workload, instructions, data structures, and so forth, which may be used by the component at a particular point in time. The mechanisms and methods disclosed herein may use some or all of these additional factors to determine a current Iccmax level and thus an appropriate VID setting, and also potentially an appropriate Fmax. For a GPU, for example, factors that may affect a magnitude of Iccmax may comprise types of instructions to be executed (e.g., on EUs), data types used, type of texture filtering performed in a sample, and other factors.

With respect to instructions to be executed (e.g., on EUs), some instructions may be known to dissipate more power than others (e.g., instructions such as mul, mad, and/or transcendentals may dissipate more power than instructions pertaining to adds and shifts). Also, systolic array multiplications, which may be used in Machine Learning (ML) applications, may draw significantly more current than 3D graphics instructions.

With respect to data types used, float-32 operations may dissipate more power than integer operations, for example.

With respect to types of texture filtering performed in a sampler, anisotropic filtering may lead to higher power dissipation than bilinear filtering, for example.

Information about some of the factors (e.g., about types of workloads, instructions, data structures, and so forth) may be known statically at compile time. For example, a compiler may be able to determine whether a shader uses float-32 or integer data types. Information about some of the factors (e.g., types of texture filtering to be used in a particular draw call) may be known at run time, as a render state gets updated and a driver fills a ring buffer. Moreover, a driver may know whether systolic array multiplications are to be spawned onto GPU EUs. If hints from a compiler and/or a driver are passed on to a pcode, the pcode may estimate an impact to Iccmax, and may adjust a VID setting accordingly (raising the setting when necessary and/or lowering it when possible) to reduce power dissipation.

Thus, when workload information such as described above is used, better estimates of Iccmax may advantageously be made, and Iccmax values may advantageously be reduced to more appropriate levels (e.g., to levels that won't cause large voltage droops and/or timing violations at transistors). Also, by estimating workload-specific Iccmax, a maximum allowed operating frequency (e.g., Fmax) may be appropriately adjusted, consistent with that Iccmax level, so that the GPU may advantageously operate at the maximum possible Fmax value each time.

Disclosed herein are various mechanisms and methods for implementing workload-dependent power management, such as Fmax licensing. In various embodiments, Iccmax for a component (e.g., a GPU) may be determined based on characteristics of a workload to be executed by the component (since Iccmax may depend upon that workload). Iccmax may depend upon, for example, the types of instructions to be executed on one or more EUs (e.g., 3D graphics or ML instructions), data types used in shaders, types of texture filtering employed, and so forth. If a compiler (and/or a driver) provides information on workload characteristics ahead of time, a pcode may appropriately adjust an Iccmax setting, a VID setting, and/or an Fmax based on the workload.

Workload-dependent Iccmax determination may have various usage models. In a first usage model of workload-depending Iccmax determination, FIG. 1 illustrates an exemplary video frame with regions resulting from different types of graphical processing, in accordance with some embodiments of the disclosure. A frame 100 from a combat game comprises a first portion 110 and a second portion 120. Frame 100 depicts a battle scene in which terrain (e.g., in first portion 110) is rendered using a first type of filtering (e.g., anisotropic filtering), while a tank (e.g., in second portion 120) is rendered using a second type of filtering (e.g., bilinear filtering).

Most of the terrain and the surroundings may be rendered first, whereas the tank may be rendered toward the end of the processing for the frame, such as by using a "Drawcall A" (e.g., a type of graphical rendering task). If the Iccmax state for the Drawcall A is the same as the Iccmax state of the rest of the frame processing except for the texture type used (e.g., bilinear as opposed to anisotropic), then Iccmax may be lower toward the end of the frame processing (e.g., during the use of Drawcall A) than in the beginning of the frame processing.

Accordingly, a VID setting may be lowered toward the end of the frame processing, which may advantageously lead to power savings. (Note that VID changes may typically take on the order of a few microseconds, whereas Drawcalls may typically last on the order of a few milliseconds, so that a VID change may take a small amount of time relative to the a duration of a Drawcall.) For example, a VID reduction from 0.85 volts (V) to 0.84 V while a Drawcall A is in progress may reduce a power dissipation for the portion of the frame processing in which Drawcall A is performed by roughly 2% (since $(0.84/0.85)^2 \cong 0.98$).

Figure 2:
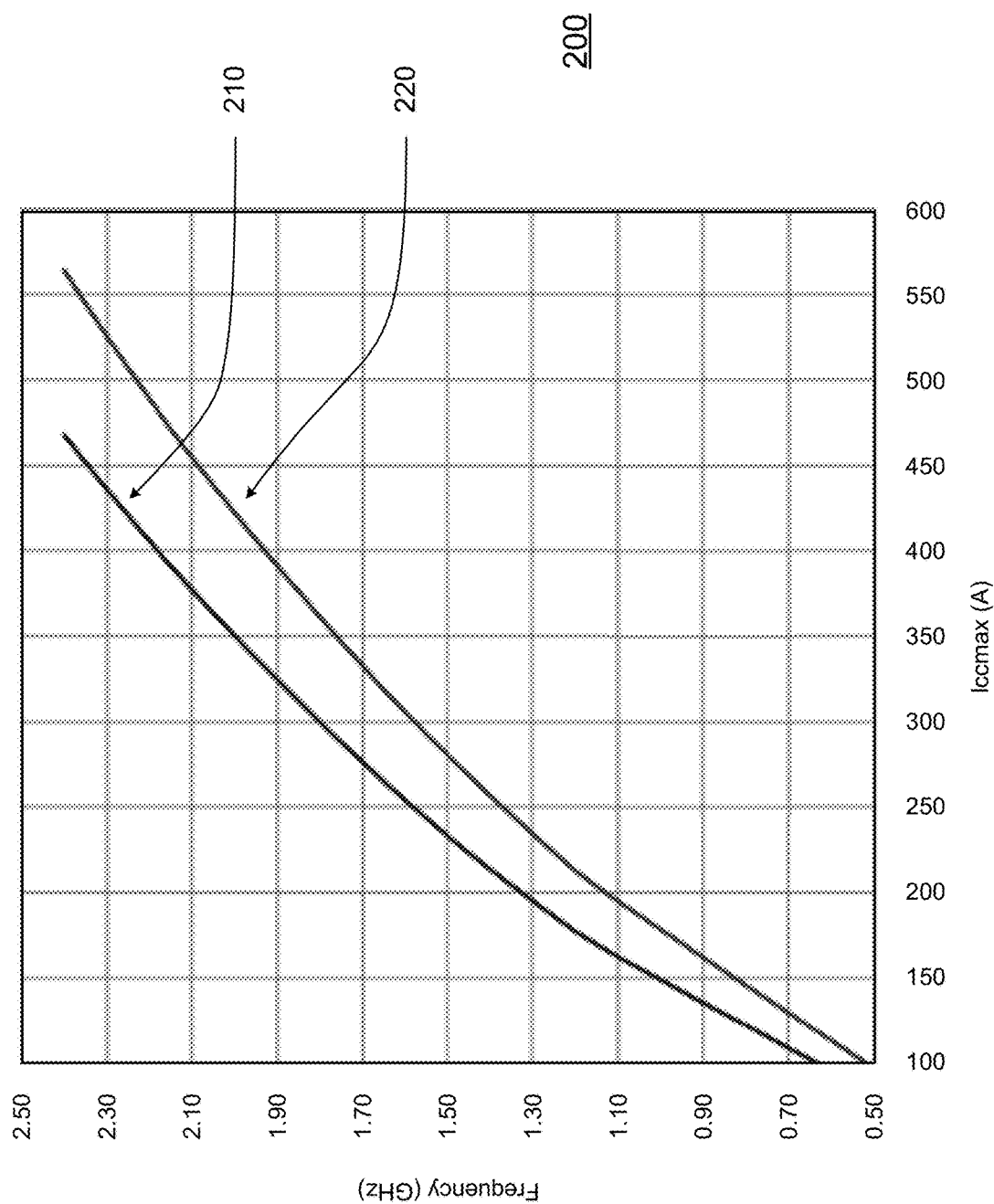
FIG. 2 illustrates a plot of frequency as a function of maximum current draw (Iccmax) for a Graphics Processing Unit (GPU) for different workloads, in accordance with some embodiments of the disclosure.

In a second usage model of workload-depending Iccmax determination, FIG. 2 illustrates a plot of frequency as a function of maximum current draw (Iccmax) for different workloads, in accordance with some embodiments of the disclosure. In a graph 200, frequency is plotted as a function of Iccmax for each tile of a four-tile discrete graphics card, for both a first workload 210 and a second workload 220. First workload 210 correspond with a 3D graphics workload, while second workload 220 corresponds with an ML workload. (For simplicity, FIG. 2 depicts a GPU Iccmax only, leaving out Iccmax for other components on a graphics card, such as high-bandwidth memory (HBM)).

ML workloads such as second workload 220 may use systolic array multiplications, which may be sources of very high Iccmax on GPU EUs. As a result, at a particular frequency, Iccmax may be significantly higher for ML workloads than for 3D graphics workloads.

For example, a graphics card power delivery system may provide up to 350 amperes (A) of Iccmax to each of the four tiles. As FIG. 2 depicts, an Iccmax of 350 A translates to an Fmax frequency of about 2.0 GHz for 3D graphics workloads and to an Fmax frequency of about 1.75 GHz for ML workloads.

Without distinguishing workload-specific Iccmax values, a system might be disposed to assume a worst case Iccmax curve (e.g., the Iccmax of ML workloads), and use the corresponding Fmax frequency (e.g., 1.75 GHz), since that may be a safe Fmax frequency for all workloads. On the other hand, if a driver (and/or a compiler) can provide hints about upcoming instructions in a command stream which is about to execute on the GPU—for example, that there are no systolic array multiplications coming up in the command stream—then a system might be disposed to use a different Iccmax curve (e.g., the Iccmax curve of 3D graphics workloads), and to use the corresponding Fmax frequency (e.g., 2.0 GHz). Per FIG. 2, such hints may accommodate a frequency boost for 3D graphics workloads of roughly 1.14× (since 2.0 GHz/1.75 GHz≅1.14×).

Figure 3:
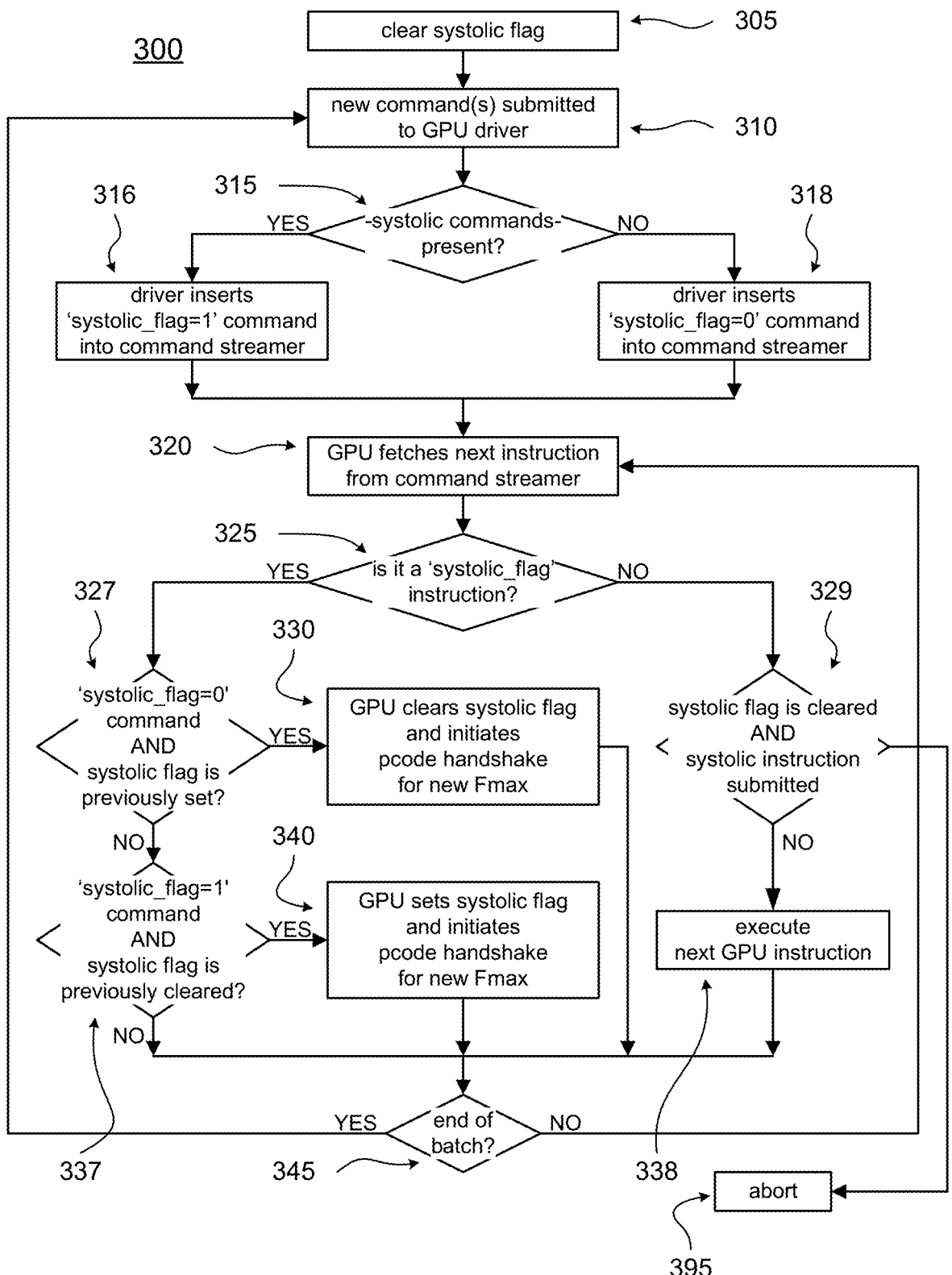
FIG. 3 illustrates an example flow diagram for implementing workload-dependent power management, in accordance with some embodiments of the disclosure.

FIG. 3 illustrates an example flow diagram for implementing workload-dependent power management, in accordance with some embodiments of the disclosure. A flow 300 may pertain to ML systolic instructions, which may be used for array multiplications, such as those that may be performed for ML training and/or ML inferencing on a multi-layer neural network. Although flow 300 may pertain to ML systolic instructions, more generally, various exemplary flows substantially similar to flow 300 may pertain to one or more instructions and/or to one or more types of instructions.

This example considers two GPU Iccmax (and Fmax) levels, one which may be applicable to workloads which do not use ML systolic instructions, and one which may be applicable to workloads which do use ML systolic instructions. Since ML systolic instructions may result in the GPU drawing significantly more current, usage of such instructions may dispose a system toward using a lower Fmax in order to enable the GPU to fit in a given Iccmax budget.

Flow 300 may comprise a block 305, a block 310, a block 316, a block 318, a block 320, a block 330, a block 338, a block 340, and/or a block 395. Flow 300 may also comprise a decision 315, a decision 325, a decision 327, a decision 329, a decision 337, and/or a decision 345.

In block 305, a systolic flag, which may indicate pending ML systolic commands, may be cleared by setting it to a first value indicating no usage of ML systolic instructions (e.g., a value of "0"). Then, in block 310, a new batch of commands may be submitted to a GPU driver.

In decision 315, the driver may parse the commands to determine whether they include any ML systolic commands. If ML systolic commands are present, then in block 316, the driver may insert an instruction indicating the presence of ML systolic commands—e.g., a "systolic_flag=1" command—in the stream of commands to be passed to a GPU command streamer. If ML systolic commands are not present, then in block 318, the driver may insert an instruction indicating the absence of ML systolic commands—e.g., a "systolic_flag=0" command—in the stream of commands to be passed to the GPU command streamer.

Flow 300 may then proceed to block 320. The GPU command streamer may now contain a group of instructions for the GPU to execute next, which may include an inserted "systolic_flag" instruction (e.g., a "systolic_flag=1" command or a "systolic_flag=0" command), which may therefore in turn indicate the presence or absence of ML systolic instructions in the GPU command streamer. The GPU may then loop through and execute all the instructions that the driver had placed in the GPU command streamer. To that end, decision 325 may determine whether the next instruction that the GPU fetches from the GPU command streamer is a "systolic_flag" instruction. If it is, flow 300 may proceed to decision 327; if not, flow 300 may proceed to decision 329.

In decision 327, flow 300 may determine whether both a "systolic_flag=0" command is present and whether the systolic_flag has the first value (e.g., was previously set to a value of "1"). If so, then in block 330, the GPU may set the systolic_flag to a second value (e.g., may clear the systolic_flag to a value of "0") and may initiate a pcode handshake to establish a new Fmax, and flow 300 may proceed to decision 345; if not, flow 300 may proceed to decision 337.

In decision 337, flow 300 may determine whether both a "systolic_flag=1" command is present and whether the systolic_flag has the second value (e.g., was previously cleared to a value of "0"). If so, then in block 340, the GPU may set the systolic_flag (e.g., may set the systolic_flag to a value of "1") and may initiate a pcode handshake to establish a new Fmax, and flow 300 may proceed to decision 345; if not, flow 300 may proceed to decision 345.

In decision 329, if the systolic_flag is cleared and a systolic instruction has been submitted, then flow 300 may proceed in block 395; if not, flow 300 may proceed to block 338. In block 338, the GPU may proceed to normally execute the next instruction in the GPU command streamer, and flow 300 may proceed to decision 345. In block 395, the current batch of instructions might not include an ML systolic instruction, yet the GPU may have encountered a "systolic_flag" instruction to be executed. In that case the GPU may treat this "systolic_flag" instruction as an illegal opcode and abort—e.g., terminate the current context it is executing—since it may be electrically unsafe to execute any systolic flag instructions at a time in the absence of an appropriate Fmax license, due to a possible Iccmax violation.

In decision 345, flow 300 may determine whether the end of the current batch of instructions has been reached. If so, flow 500 may proceed to block 310 (where a new batch of commands may be submitted to the GPU driver); if not, flow 300 may proceed to block 320 (where the GPU may fetch the next instruction from the GPU command streamer).

Accordingly, if a "systolic_flag" instruction clears the systolic flag when it was previously set, or sets the systolic flag when it was previously cleared, the GPU may handshake with pcode to get a new Fmax value. (Pcode may be firmware running on the component that dictates a GPU maximum operating frequency, among other things. The GPU may perform this handshake and wait for a short time—on the order of tens or hundreds of micro-seconds—for pcode to assign to it a new appropriate Fmax value.) Else, there may be no need for a pcode handshake, since the systolic flag is not about to flip.

Figure 4:
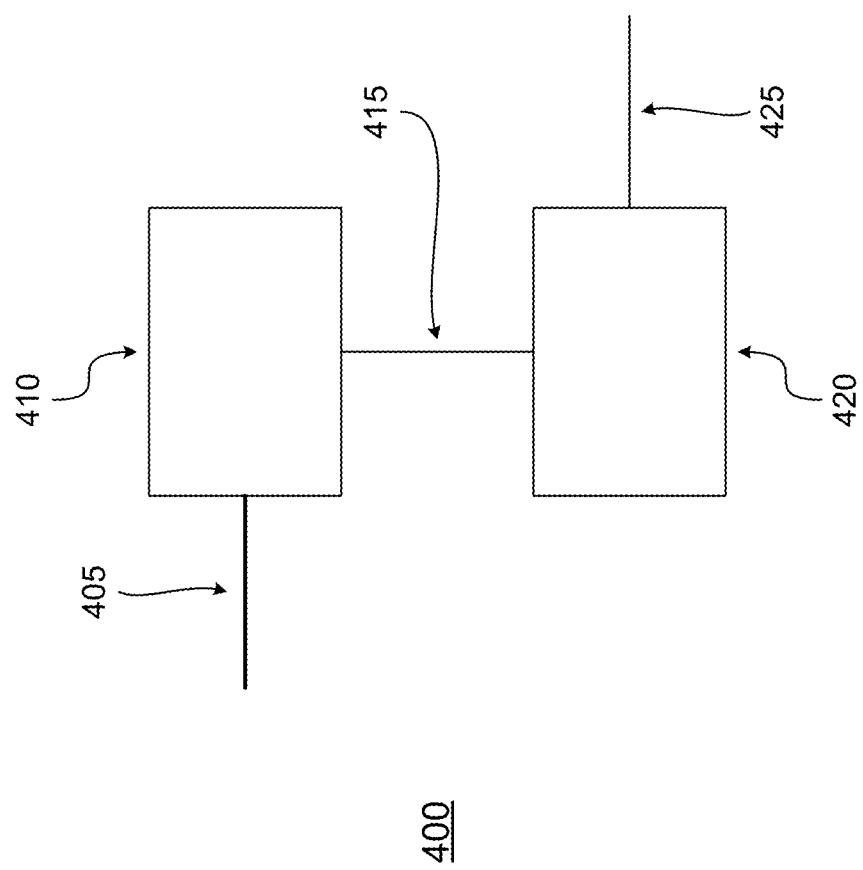
FIG. 4 illustrates an example design comprising circuitries for implementing workload-dependent power management, in accordance with some embodiments of the disclosure.

FIG. 4 illustrates an example design comprising circuitries for implementing workload-dependent power management, in accordance with some embodiments of the disclosure. A design 100 (which may be a portion of a GPU) comprises a first circuitry 410 and a second circuitry 420.

In a variety of embodiments, first circuitry 410 may be operable to process a sequence of GPU commands (which may be carried on a signal path 405). The sequence of GPU commands may include an instruction carrying a flag that indicates a workload characteristic corresponding with the sequence of GPU commands (such as a systolic flag instruction). Second circuitry 420 may be operable to initiate a power-directed parameter adjustment based upon the flag (such as a change in Fmax). First circuitry 410 may indicate flags carrying workload characteristics via an interface signal 415. Second circuitry 420 may initiate the power-directed parameter adjustment via a signal path 425.

In some embodiments, the flag may indicate a type of texture filtering associated with a subsequent portion of the sequence of GPU commands and/or a type of instruction associated with the subsequent portion of the sequence of GPU commands. For some embodiments, the type of texture filtering may be anisotropic filtering, linear filtering, or bilinear filtering. For some embodiments, the type of instruction may be a systolic array matrix multiplication instruction (which may be, e.g., an ML matrix multiplication instruction).

For some embodiments, the power-directed parameter adjustment may include a firmware handshake (e.g., a handshake with pcode). In some embodiments, the power-directed parameter adjustment may be for a supply voltage and/or a frequency.

For some embodiments, the instruction may be a first instruction carrying a first flag indicating a first workload characteristic corresponding with a first portion of the sequence of GPU commands, and the sequence of GPU commands may include a second instruction carrying a second flag indicating a second workload characteristic corresponding with a second portion of the sequence of GPU commands. Second circuitry 420 may initiate a first power-directed parameter adjustment based upon the first flag and may initiate a second power-directed parameter adjustment based upon the second flag.

In some embodiments, the first flag may indicate that the first portion of the sequence of GPU commands comprises one or more systolic array instructions. For some embodiments, the second flag may indicate that the second portion of the sequence of GPU commands does not comprise systolic array instructions. In some embodiments, the first power-directed parameter adjustment may include a downward adjustment of a voltage parameter and/or an upward adjustment of a frequency parameter.

In a variety of embodiments, first circuitry 410 may be a command list circuitry and may process a sequence of GPU commands including a flag instruction that indicates a workload characteristic corresponding with the sequence of GPU commands. Second circuitry 420 may be a handshake circuitry and may initiate a power-directed parameter adjustment protocol based upon the flag.

In some embodiments, the flag instruction may indicate a type of texture filtering associated with a subsequent portion of the sequence of GPU commands and/or or a type of instruction associated with the subsequent portion of the sequence of GPU commands. For some embodiments, the type of texture filtering may be anisotropic filtering, linear filtering, or bilinear filtering. For some embodiments, the type of instruction may be a systolic array matrix multiplication instruction.

In some embodiments, the power-directed parameter adjustment protocol may include a firmware handshake. For some embodiments, the power-directed parameter adjustment protocol may be for a supply voltage and/or a frequency.

For some embodiments, the flag instruction may be a first flag instruction indicating a first workload characteristic corresponding with a first portion of the sequence of GPU commands. The sequence of GPU commands may include a second flag instruction indicating a second workload characteristic corresponding with a second portion of the sequence of GPU commands. The handshake circuitry may initiate a first power-directed parameter adjustment based upon the first flag and/or a second power-directed parameter adjustment based upon the second flag.

In some embodiments, the first flag instruction may indicate that the first portion of the sequence of GPU commands comprises one or more systolic array instructions. In some embodiments, the second flag instruction may indicate that the second portion of the sequence of GPU commands does not comprise systolic array instructions. In some embodiments, the first power-directed parameter adjustment may include a downward adjustment of a voltage parameter and/or an upward adjustment of a frequency parameter, and the second power-directed parameter adjustment may include an upward adjustment of the voltage parameter and/or a downward adjustment of the frequency parameter.

Figure 5:
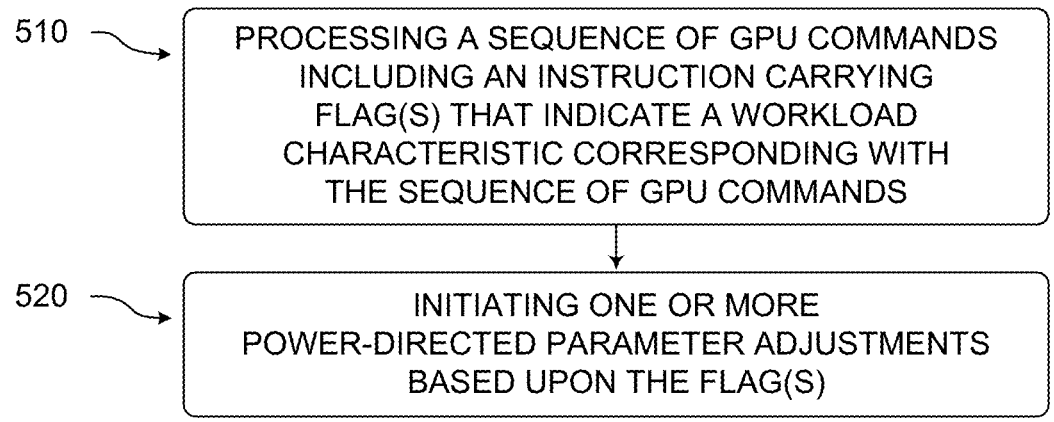
FIG. 5 illustrates example methods for implementing workload-dependent power management, in accordance with some embodiments of the disclosure.

FIG. 5 illustrates example methods for implementing workload-dependent power management, in accordance with some embodiments of the disclosure. A method 500 may comprise a processing 510 and an initiating 520. In processing 510, a sequence of GPU commands may be processed. The sequence of GPU commands may include an instruction carrying one or more flags that indicates a workload characteristic corresponding with the sequence of GPU commands. In initiating 520, one or more power-directed parameter adjustments may be initiated based upon the one or more flags.

In some embodiments, the flag may indicate a type of texture filtering associated with a subsequent portion of the sequence of GPU commands and/or a type of instruction associated with the subsequent portion of the sequence of GPU commands. For some embodiments, the type of texture filtering may be anisotropic filtering, linear filtering, or bilinear filtering. For some embodiments, the type of instruction may be a systolic array matrix multiplication instruction.

For some embodiments, the power-directed parameter adjustment may include a firmware handshake (e.g., a handshake with pcode). In some embodiments, the power-directed parameter adjustment may be for a supply voltage and/or a frequency.

For some embodiments, the instruction may be a first instruction carrying a first flag indicating a first workload characteristic corresponding with a first portion of the sequence of GPU commands, and the sequence of GPU commands may include a second instruction carrying a second flag indicating a second workload characteristic corresponding with a second portion of the sequence of GPU commands. Second circuitry 420 may initiate a first power-directed parameter adjustment based upon the first flag and may initiate a second power-directed parameter adjustment based upon the second flag.

In some embodiments, the first flag may indicate that the first portion of the sequence of GPU commands comprises one or more systolic array instructions. For some embodiments, the second flag may indicate that the second portion of the sequence of GPU commands does not comprise systolic array instructions. In some embodiments, the first power-directed parameter adjustment may include a downward adjustment of a voltage parameter and/or an upward adjustment of a frequency parameter.

Although the actions in the flowchart with reference to FIG. 5 are shown in a particular order, the order of the actions can be modified. Thus, the illustrated embodiments can be performed in a different order, and some actions may be performed in parallel. Some of the actions and/or operations listed in FIG. 5 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIG. 5.

Moreover, in some embodiments, machine readable storage media may have executable instructions that, when executed, cause one or more processors to perform an operation comprising a method of FIG. 5. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 6:
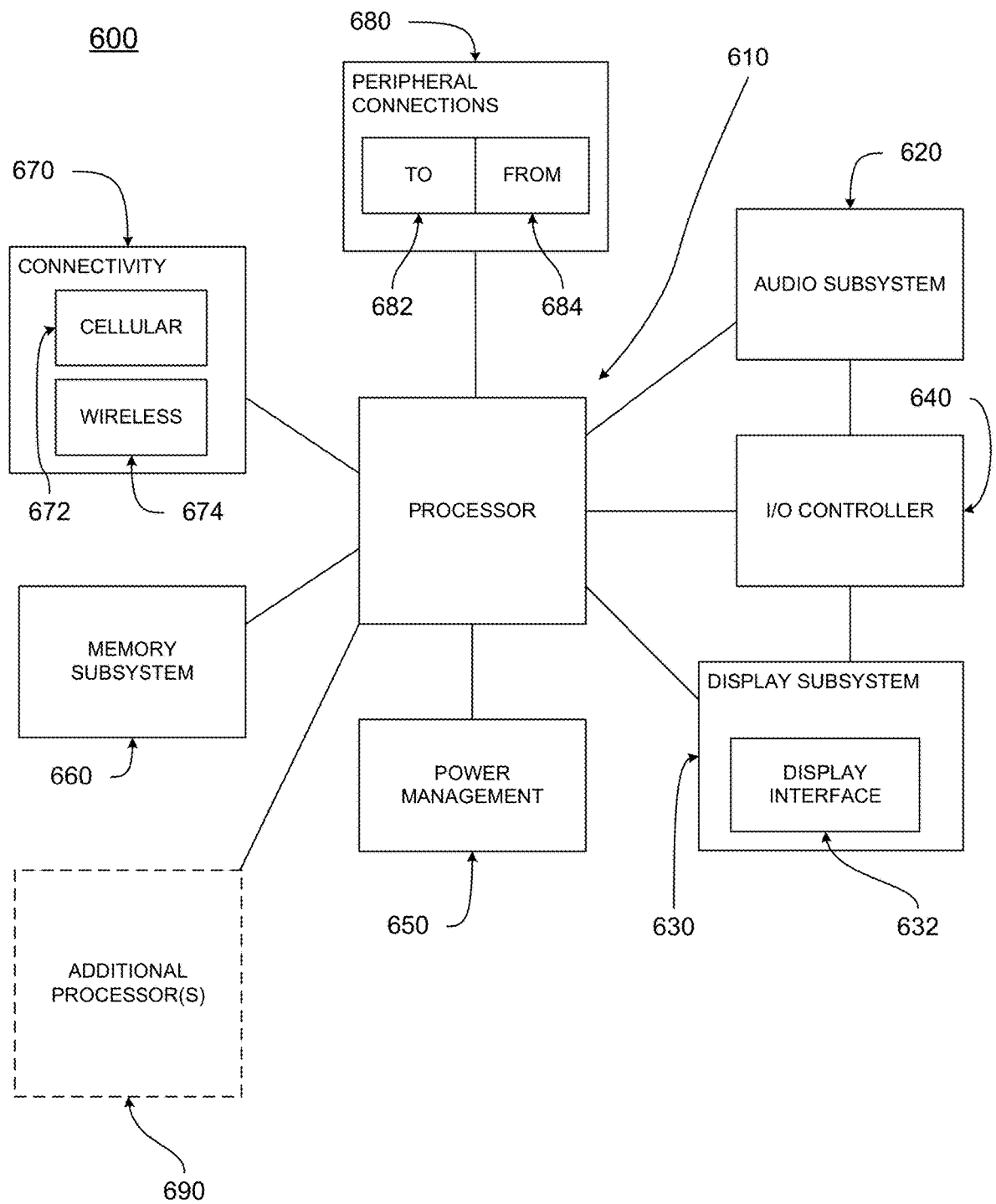
FIG. 6 illustrates a computing device with mechanisms for implementing workload-dependent power management, in accordance with some embodiments of the disclosure.

FIG. 6 illustrates a computing device with mechanisms for implementing workload-dependent power management, in accordance with some embodiments of the disclosure. Computing device 600 may be a graphics card, a computer system, a System-on-a-Chip (SoC), a tablet, a mobile device, a smart device, or a smart phone with mechanisms for implementing workload-dependent power management, in accordance with some embodiments of the disclosure. It will be understood that certain components of computing device 600 are shown generally, and not all components of such a device are shown FIG. 6. Moreover, while some of the components may be physically separate, others may be integrated within the same physical package, or even on the same physical silicon die. Accordingly, the separation between the various components as depicted in FIG. 6 may not be physical in some cases, but may instead be a functional separation. It is also pointed out that those elements of FIG. 6 having the same names or reference numbers as the elements of any other figure can operate or function in any manner similar to that described, but are not limited to such.

In various embodiments, the components of computing device 600 may include any of a processor 610, an audio subsystem 620, a display subsystem 630, an I/O controller 640, a power management component 650, a memory subsystem 660, a connectivity component 670, one or more peripheral connections 680, and one or more additional processors 690. In some embodiments, processor 610 may include mechanisms for implementing workload-dependent power management, in accordance with some embodiments of the disclosure. In various embodiments, however, any of the components of computing device 600 may include the mechanisms for implementing workload-dependent power management, in accordance with some embodiments of the disclosure. In addition, one or more components of computing device 600 may include an interconnect fabric having a plurality of ports, such as a router, a network of routers, or a Network-on-a-Chip (NoC).

In some embodiments, computing device 600 may be a mobile device which may be operable to use flat surface interface connectors. In one embodiment, computing device 600 may be a mobile computing device, such as a computing tablet, a mobile phone or smart-phone, a wireless-enabled e-reader, or other wireless mobile device. The various embodiments of the present disclosure may also comprise a network interface within 670 such as a wireless interface so that a system embodiment may be incorporated into a wireless device, for example a cell phone or personal digital assistant.

Processor 610 may be a general-purpose processor or CPU (Central Processing Unit). In some embodiments, processor 610 may include one or more physical devices, such as microprocessors, application processors, microcontrollers, programmable logic devices, or other processing means. The processing operations performed by processor 610 may include the execution of an operating platform or operating system on which applications and/or device functions may then be executed. The processing operations may also include operations related to one or more of the following: audio I/O; display I/O; power management; connecting computing device 600 to another device; and/or I/O (input/output) with a human user or with other devices.

Audio subsystem 620 may include hardware components (e.g., audio hardware and audio circuits) and software components (e.g., drivers and/or codecs) associated with providing audio functions to computing device 600. Audio functions can include speaker and/or headphone output as well as microphone input. Devices for such functions can be integrated into computing device 600, or connected to computing device 600. In one embodiment, a user interacts with computing device 600 by providing audio commands that are received and processed by processor 610.

Display subsystem 630 may include hardware components (e.g., display devices) and software components (e.g., drivers) that provide a visual and/or tactile display for a user to interact with computing device 600. Display subsystem 630 may include a display interface 632, which may be a particular screen or hardware device used to provide a display to a user. In one embodiment, display interface 632 includes logic separate from processor 610 to perform at least some processing related to the display. In some embodiments, display subsystem 630 includes a touch screen (or touch pad) device that provides both output and input to a user.

I/O controller 640 may include hardware devices and software components related to interaction with a user. I/O controller 640 may be operable to manage hardware that is part of audio subsystem 620 and/or display subsystem 630. Additionally, I/O controller 640 may be a connection point for additional devices that connect to computing device 600, through which a user might interact with the system. For example, devices that can be attached to computing device 600 might include microphone devices, speaker or stereo systems, video systems or other display devices, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of computing device 600. Additionally, audio output can be provided instead of, or in addition to, display output. In another example, if display subsystem 630 includes a touch screen, the display device may also act as an input device, which can be at least partially managed by I/O controller 640. There can also be additional buttons or switches on computing device 600 to provide I/O functions managed by I/O controller 640.

In some embodiments, I/O controller 640 manages devices such as accelerometers, cameras, light sensors or other environmental sensors, or other hardware that can be included in computing device 600. The input can be part of direct user interaction, and may provide environmental input to the system to influence its operations (such as filtering for noise, adjusting displays for brightness detection, applying a flash for a camera, or other features).

Power management component 650 may include hardware components (e.g., power management devices and/or circuitry) and software components (e.g., drivers and/or firmware) associated with managing battery power usage, battery charging, and features related to power saving operation.

Memory subsystem 660 may include one or more memory devices for storing information in computing device 600. Memory subsystem 660 can include nonvolatile memory devices (whose state does not change if power to the memory device is interrupted) and/or volatile memory devices (whose state is indeterminate if power to the memory device is interrupted). Memory subsystem 660 can store application data, user data, music, photos, documents, or other data, as well as system data (whether long-term or temporary) related to the execution of the applications and functions of computing device 600.

Some portion of memory subsystem 660 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 670 may include a network interface, such as a cellular interface 672 or a wireless interface 674 (so that an embodiment of computing device 600 may be incorporated into a wireless device such as a cellular phone or a personal digital assistant). In some embodiments, connectivity component 670 includes hardware devices (e.g., wireless and/or wired connectors and communication hardware) and software components (e.g., drivers and/or protocol stacks) to enable computing device 600 to communicate with external devices. Computing device 600 could include separate devices, such as other computing devices, wireless access points or base stations, as well as peripherals such as headsets, printers, or other devices.

In some embodiments, connectivity component 670 can include multiple different types of network interfaces, such as one or more wireless interfaces for allowing processor 610 to communicate with another device. To generalize, computing device 600 is illustrated with cellular interface 672 and wireless interface 674. Cellular interface 672 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 674 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 680 may include hardware interfaces and connectors, as well as software components (e.g., drivers and/or protocol stacks) to make peripheral connections. It will be understood that computing device 600 could both be a peripheral device to other computing devices (via "to" 682), as well as have peripheral devices connected to it (via "from" 684). The computing device 600 may have a "docking" connector to connect to other computing devices for purposes such as managing content on computing device 600 (e.g., downloading and/or uploading, changing, synchronizing). Additionally, a docking connector can allow computing device 600 to connect to certain peripherals that allow computing device 600 to control content output, for example, to audiovisual or other systems.

In addition to a proprietary docking connector or other proprietary connection hardware, computing device 600 can make peripheral connections 680 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus comprising: a first circuitry to process a sequence of GPU commands including an instruction carrying a flag that indicates a workload characteristic corresponding with the sequence of GPU commands; and a second circuitry to initiate a power-directed parameter adjustment based upon the flag.

In example 2, the apparatus of example 1, wherein the flag indicates at least one of: a type of texture filtering associated with a subsequent portion of the sequence of GPU commands, or a type of instruction associated with the subsequent portion of the sequence of GPU commands.

In example 3, the apparatus of example 2, wherein the type of texture filtering is selected from one of: anisotropic filtering, linear filtering, or bilinear filtering.

In example 4, the apparatus of example 2, wherein the type of instruction is a systolic array matrix multiplication instruction.

In example 5, the apparatus of example 1, wherein the power-directed parameter adjustment includes a firmware handshake.

In example 6, the apparatus of example 1, wherein the power-directed parameter adjustment is for at least one of: a supply voltage, or a frequency.

In example 7, the apparatus of example 1, wherein the instruction is a first instruction carrying a first flag indicating a first workload characteristic corresponding with a first portion of the sequence of GPU commands; and wherein the sequence of GPU commands includes a second instruction carrying a second flag indicating a second workload characteristic corresponding with a second portion of the sequence of GPU commands; wherein the second circuitry is to initiate a first power-directed parameter adjustment based upon the first flag; and wherein the second circuitry is to initiate a second power-directed parameter adjustment based upon the second flag.

In example 8, the apparatus of example 7, wherein the first flag indicates that the first portion of the sequence of GPU commands comprises one or more systolic array matrix multiplication instruction.

In example 9, the apparatus of example 7, wherein the second flag indicates that the second portion of the sequence of GPU commands does not comprise systolic array matrix multiplication instruction.

In example 10, the apparatus of example 7, wherein the first power-directed parameter adjustment includes at least one of: a downward adjustment of a voltage parameter, or an upward adjustment of a frequency parameter.

Example 11 provides an apparatus comprising: a command list circuitry to process a sequence of GPU commands including a flag instruction that indicates a workload characteristic corresponding with the sequence of GPU commands; and a handshake circuitry to initiate a power-directed parameter adjustment protocol based upon the flag.

In example 12, the apparatus of example 11, wherein the flag instruction indicates at least one of: a type of texture filtering associated with a subsequent portion of the sequence of GPU commands, or a type of instruction associated with the subsequent portion of the sequence of GPU commands; wherein the power-directed parameter adjustment protocol includes a firmware handshake; wherein the type of texture filtering is selected from one of: anisotropic filtering, linear filtering, or bilinear filtering; and wherein the type of instruction is a systolic array matrix multiplication instruction.

In example 13, the apparatus of example 11, wherein the power-directed parameter adjustment protocol is for at least one of: a supply voltage, or a frequency.

In example 14, the apparatus of example 11, wherein the flag instruction is a first flag instruction indicating a first workload characteristic corresponding with a first portion of the sequence of GPU commands; and wherein the sequence of GPU commands includes a second flag instruction indicating a second workload characteristic corresponding with a second portion of the sequence of GPU commands; wherein the handshake circuitry is to initiate a first power-directed parameter adjustment based upon the first flag; and wherein the handshake circuitry is to initiate a second power-directed parameter adjustment based upon the second flag.

In example 15, the apparatus of example 14, wherein the first flag instruction indicates that the first portion of the sequence of GPU commands comprises one or more systolic array matrix multiplication instruction; and wherein the second flag instruction indicates that the second portion of the sequence of GPU commands does not comprise systolic array matrix multiplication instruction.

In example 16, the apparatus of example 15, wherein the first power-directed parameter adjustment includes at least one of: a downward adjustment of a voltage parameter, or an upward adjustment of a frequency parameter; and wherein the second power-directed parameter adjustment includes at least one of: an upward adjustment of the voltage parameter, or a downward adjustment of the frequency parameter.

Example 17 provides a system comprising a memory, a processor coupled to the memory, and a wireless interface for allowing the processor to communicate with another device, the processor including: a first circuitry to process a sequence of GPU commands including a first instruction carrying a first flag that indicates a first workload characteristic corresponding with a first portion of the sequence of GPU commands, and a second instruction carrying a second flag that indicates a second workload characteristic corresponding with a second portion of the sequence of GPU commands; and a second circuitry to initiate a first power-directed parameter adjustment based upon the first flag, and a second power-directed parameter adjustment based upon the second flag.

In example 18, the system of example 17, wherein the first flag indicates at least one of: a type of texture filtering associated with the first portion of the sequence of GPU commands, or a type of instruction associated with the first portion of the sequence of GPU commands; wherein the type of texture filtering is selected from one of: anisotropic filtering, linear filtering, or bilinear filtering; wherein the type of instruction is a systolic array matrix multiplication instruction.

In example 19, the system of example 17, wherein the first power-directed parameter adjustment includes a first part of a firmware handshake; wherein the second power-directed parameter adjustment includes a second part of the firmware handshake; wherein the first power-directed parameter adjustment includes at least one of: a downward adjustment of a voltage parameter, or an upward adjustment of a frequency parameter; wherein the second power-directed parameter adjustment includes at least one of: an upward adjustment of the voltage parameter, or a downward adjustment of the frequency parameter; and wherein the first power-directed parameter adjustment and the second power-directed parameter adjustment are for at least one of: a supply voltage, or a frequency.

In example 20, the system of example 17, wherein the first flag indicates that the first portion of the sequence of GPU commands comprises systolic array matrix multiplication instruction; and wherein the second flag indicates that the second portion of the sequence of GPU commands does not comprise systolic array matrix multiplication instruction.

Example 21 provides a method comprising: processing a sequence of GPU commands including an instruction carrying one or more flags that indicates a workload characteristic corresponding with the sequence of GPU commands; and initiating one or more power-directed parameter adjustments based upon the one or more flags.

In example 22, the method of example 21, wherein the flag indicates at least one of: a type of texture filtering associated with a subsequent portion of the sequence of GPU commands, or a type of instruction associated with the subsequent portion of the sequence of GPU commands; wherein the type of texture filtering is selected from one of: anisotropic filtering, linear filtering, or bilinear filtering; wherein the type of instruction is a systolic array matrix multiplication instruction; wherein the power-directed parameter adjustment includes a firmware handshake; and wherein the power-directed parameter adjustment is for at least one of: a supply voltage, or a frequency.

In example 23, the method of example 21, wherein the instruction is a first instruction carrying a first flag indicating a first workload characteristic corresponding with a first portion of the sequence of GPU commands; and wherein the sequence of GPU commands includes a second instruction carrying a second flag indicating a second workload characteristic corresponding with a second portion of the sequence of GPU commands; wherein the second circuitry is to initiate a first power-directed parameter adjustment based upon the first flag; and wherein the second circuitry is to initiate a second power-directed parameter adjustment based upon the second flag.

In example 24, the method of example 23, wherein the first flag indicates that the first portion of the sequence of GPU commands comprises one or more systolic array matrix multiplication instruction; wherein the second flag indicates that the second portion of the sequence of GPU commands does not comprise systolic array matrix multiplication instruction; and wherein the first power-directed parameter adjustment includes at least one of: a downward adjustment of a voltage parameter, or an upward adjustment of a frequency parameter.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
a first circuitry to process a sequence of Graphics Processing Unit (GPU) commands including a first instruction carrying a first flag that indicates a first workload characteristic corresponding with a first portion of the sequence of GPU commands and a second instruction carrying a second flag that indicates a second workload characteristic corresponding with a second portion of the sequence of GPU commands; and
a second circuitry to initiate a first power-directed parameter adjustment based upon the first flag and a second power-directed parameter adjustment based upon the second flag,
wherein the first flag indicates at least one of: a type of texture filtering associated with the first portion of the sequence of GPU commands, or a type of instruction associated with the first portion of the sequence of GPU commands.

2. The apparatus of claim 1,
wherein the type of texture filtering is selected from one of: anisotropic filtering, linear filtering, or bilinear filtering.

3. The apparatus of claim 1,
wherein the type of instruction is a systolic array matrix multiplication instruction.

4. The apparatus of claim 1,
wherein the first or second power-directed parameter adjustment includes a firmware handshake.

5. The apparatus of claim 1,
wherein the first or second power-directed parameter adjustment is for at least one of: a supply voltage, or a frequency.

6. The apparatus of claim 1,
wherein the first flag indicates that the first portion of the sequence of GPU commands comprises one or more systolic array matrix multiplication instructions.

7. The apparatus of claim 1,
wherein the second flag indicates that the second portion of the sequence of GPU commands does not comprise systolic array matrix multiplication instruction.

8. The apparatus of claim 1, wherein the first power-directed parameter adjustment includes at least one of: a downward adjustment of a voltage parameter, or an upward adjustment of a frequency parameter.

9. An apparatus comprising:
a command list circuitry to process a sequence of Graphics Processing Unit (GPU) commands including a first flag instruction that indicates a first workload characteristic corresponding with a first portion of the sequence of GPU commands and a second flag instruction indicating a second workload characteristic corresponding with a second portion of the sequence of GPU commands; and
a handshake circuitry to initiate a first power-directed parameter adjustment based upon the first flag instruction and initiate a second power-directed parameter adjustment based upon the second flag instruction, wherein the first flag instruction indicates at least one of: a type of texture filtering associated with the first portion of the sequence of GPU commands, or a type of instruction associated with the first portion of the sequence of GPU commands.

10. The apparatus of claim 9,
wherein the first power-directed parameter adjustment includes a firmware handshake;
wherein the type of texture filtering is selected from one of: anisotropic filtering, linear filtering, or bilinear filtering; and
wherein the type of instruction is a systolic array matrix multiplication instruction.

11. The apparatus of claim 9, wherein the first power-directed parameter adjustment is for at least one of: a supply voltage, or a frequency.

12. The apparatus of claim 9,
wherein the first flag instruction indicates that the first portion of the sequence of GPU commands comprises one or more systolic array matrix multiplication instructions; and
wherein the second flag instruction indicates that the second portion of the sequence of GPU commands does not comprise systolic array matrix multiplication instruction.

13. The apparatus of claim 12,
wherein the first power-directed parameter adjustment includes at least one of: a downward adjustment of a voltage parameter, or an upward adjustment of a frequency parameter; and
wherein the second power-directed parameter adjustment includes at least one of: an upward adjustment of the voltage parameter, or a downward adjustment of the frequency parameter.

14. A system comprising a memory, a processor coupled to the memory, and a wireless interface for allowing the processor to communicate with another device, the processor including:
a first circuitry to process a sequence of Graphics Processing Unit (GPU) commands including a first instruction carrying a first flag that indicates a first workload characteristic corresponding with a first portion of the sequence of GPU commands, and a second instruction carrying a second flag that indicates a second workload characteristic corresponding with a second portion of the sequence of GPU commands; and
a second circuitry to initiate a first power-directed parameter adjustment based upon the first flag, and a second power-directed parameter adjustment based upon the second flag,
wherein the first flag indicates at least one of: a type of texture filtering associated with the first portion of the sequence of GPU commands, or a type of instruction associated with the first portion of the sequence of GPU commands.

15. The system of claim 14,
wherein the type of texture filtering is selected from one of: anisotropic filtering, linear filtering, or bilinear filtering;
wherein the type of instruction is a systolic array matrix multiplication instruction.

16. The system of claim 14,
wherein the first power-directed parameter adjustment includes a first part of a firmware handshake;
wherein the second power-directed parameter adjustment includes a second part of the firmware handshake;
wherein the first power-directed parameter adjustment includes at least one of: a downward adjustment of a voltage parameter, or an upward adjustment of a frequency parameter;
wherein the second power-directed parameter adjustment includes at least one of: an upward adjustment of the voltage parameter, or a downward adjustment of the frequency parameter; and
wherein the first power-directed parameter adjustment and the second power-directed parameter adjustment are for at least one of: a supply voltage, or a frequency.

17. The system of claim 14,
wherein the first flag indicates that the first portion of the sequence of GPU commands comprises systolic array matrix multiplication instruction; and
wherein the second flag indicates that the second portion of the sequence of GPU commands does not comprise systolic array matrix multiplication instruction.

* * * * *